May 10, 1960 R. J. CAYTON 2,935,881
VERTICAL BLIND DRIVE MECHANISM
Filed Dec. 18, 1957
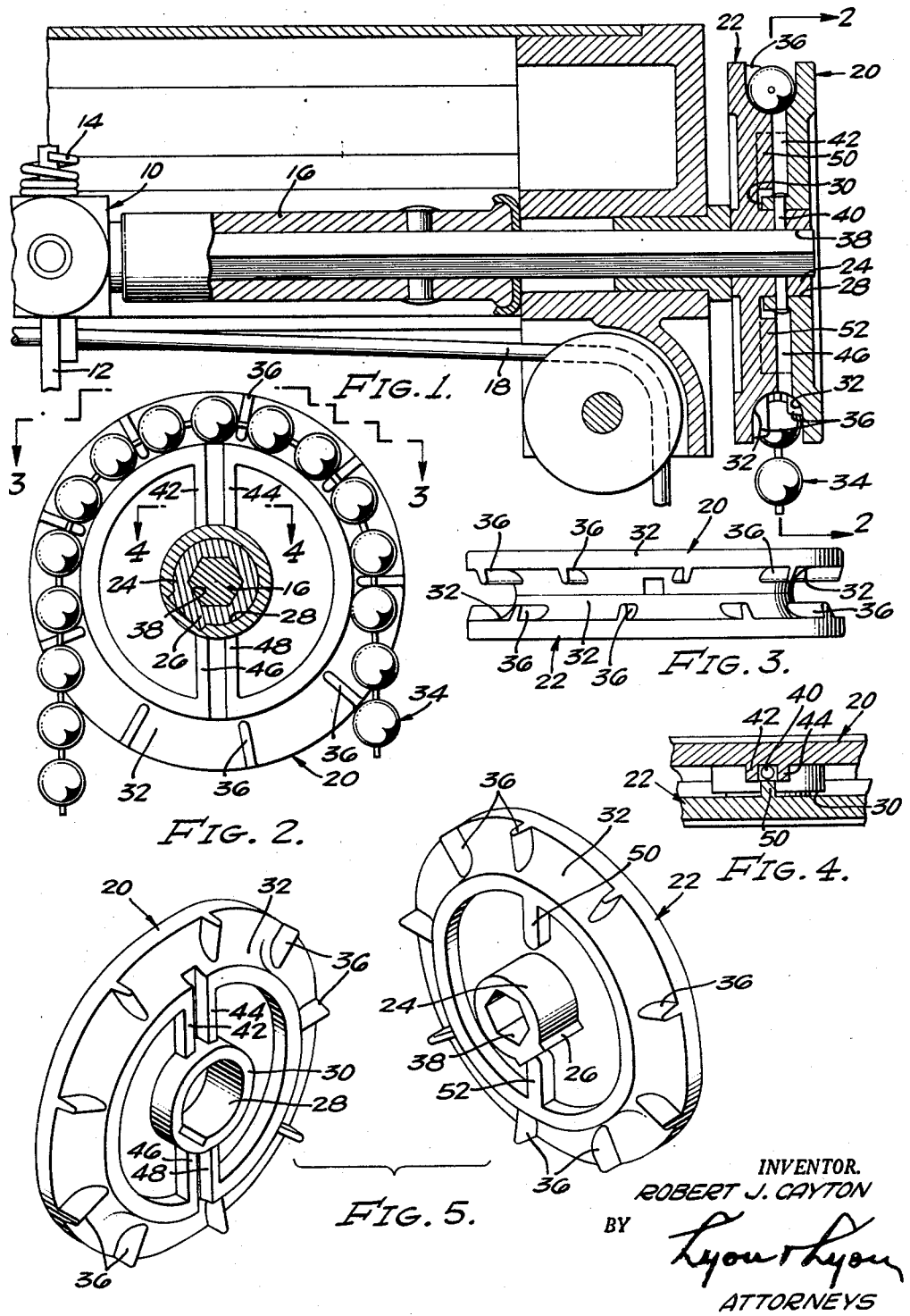
INVENTOR.
ROBERT J. CAYTON
BY
Lyon & Lyon
ATTORNEYS United States Patent Office
2,935,881
Patented May 10, 1960

2,935,881

VERTICAL BLIND DRIVE MECHANISM

Robert J. Cayton, Los Angeles, Calif.

Application December 18, 1957, Serial No. 703,645

6 Claims. (Cl. 74—243)

This invention relates to an improved drive mechanism for a vertical blind.

In the installation of vertical blinds, particularly the cloth slat type capable of traversing as well as rotating it is desirable to be able to fully fill the area within which the blind is to be mounted and to eliminate any light leakage.

It is therefore, an object of this invention to provide an improved drive mechanism for such a blind which will not interfere with installation of the blind or allow light leakage through the blind.

It is still a further object of this invention to provide a drive mechanism which is readily and rapidly assembled upon the drive shaft of such a blind.

It is still a further object of this invention to provide a simplified manner of keying such a drive mechanism to the drive shaft of such a blind.

Other objects and advantages will be readily apparent from the following description:

In the drawings:

Figure 1 is a fragmentary sectional view of a drive mechanism embodying this invention keyed to the drive shaft of a rotating and traversing vertical blind.

Figure 2 is a view taken along line 2—2 of Figure 1.

Figure 3 is a view taken along line 3—3 of Figure 2.

Figure 4 is a view taken along line 4—4 of Figure 2.

Figure 5 is a perspective of the drive mechanism halves.

This invention is an improvement upon the device illustrated and described in my copending application entitled Vertical Venetian Blinds, Serial No. 569,802, filed March 6, 1956.

The truck 10 to which slat holding hook 12 is resiliently secured by spring 14 is mounted upon hexagonal rod 16 rotation of which rotates the hooks 12 and hence the slat supported thereon. Traversing of the blind is accomplished through cord 18 as described in the above-identified application. This invention is concerned with the mechanism for driving rod 16.

A pair of circular plates 20 and 22 are utilized. Plate 22 has a centrally located protuberance 24 with a key 26 formed thereon. Plate 20 has a central bore 28, shaped to receive protuberance 24 and key 26 locking the two plates together in an aligned position and preventing rotation with respect to one another. A flange 30 on the inner face of plate 20 is of the same length as protuberance 24 and surrounds same.

The inner face of the periphery of each plate is dished out as at 32 so that when the plates are assembled together a channel is formed to receive beaded chain 34. Also a series of projections 36 are provided on each plate in altering relationship to engage between beads of chain 34 so that pulling on the chain rotates the pulley formed by the two plates to rotate rod 16 which passes through a suitable hexagonal bore 38 in protuberance 24.

To key the pulley halves together and to rod 16 a pin 40 is utilized. To insert pin 40 the flange 30, protuberance 24 and rod 16 must first be drilled. Guide means for this drilling process is provided on the inner faces of plates 20 and 22.

A pair of parallel flanges 42 and 44 are spaced slightly larger than the diameter of the hole to be bored and extending from the dished out periphery of plate 20 to flange 30. A similar pair of flanges 46 and 48 are positioned on the opposite side of flange 30 and on the same diameter as flanges 42 and 44, thus forming a U-shaped diametric channel interrupted by flange 30.

Similarly plate 22 has a pair of diametrically aligned segments 50 and 52 which when the plates are aligned close the open channel formed in plate 20 as best seen in Fig. 4. A suitable drill bit is then inserted into the guide channel between flanges 42 and 44a and the flange 30, protuberance 24 and rod 16 are drilled. The drill bit is then removed and the channel functions to guide insertion of pin 40.

While what hereinbefore has been described as the preferred embodiment of this invention it is readily apparent that alterations and modifications can be resorted to without departing from the scope of this invention and such alterations and modifications are intended to be included within the scope of the appended claims.

I claim:

1. A drive mechanism for a rotating and traversing vertical blind including an other than circular rod comprising: a pair of plates, a protuberance on one of said plates having a bore therethrough receiving a rod, a bore in said other plate receiving said protuberance, a flange on said second mentioned plate surrounding said protuberance, the periphery of said plates being formed to receive a chain, and pin guide means from said periphery to said flange.

2. A drive mechanism for a rotating and traversing vertical blind including an other than circular rod comprising: a pair of plates, a protuberance on one of said plates having a bore therethrough receiving a rod, a bore in said other plate receiving said protuberance, a flange on said second mentioned plate surrounding said protuberance, means keying said protuberance to said flange, the periphery of said plates being formed to receive a chain, and pin guide means from said periphery to said flange.

3. A drive mechanism for a rotating and traversing vertical blind including an other than circular rod comprising: a pair of plates, a protuberance on one of said plates having a bore therethrough receiving a rod, a bore in said other plate receiving said protuberance, a flange on said second mentioned plate surrounding said protuberance, means keying said protuberance to said flange, the periphery of said plates being formed to receive a chain, and means in said plates forming a guide channel from the periphery of said plates to said flange.

4. A drive mechanism for a rotating and traversing vertical blind including an other than circular rod comprising: a pair of plates, a protuberance on one of said plates having a bore therethrough receiving a rod, a bore in said other plate receiving said protuberance, a flange on said second mentioned plate surrounding said protuberance, means keying said protuberance to said flange, the periphery of said plates being formed to receive a chain, pin guide means from said periphery to said flange, and means in said plates forming a guide channel from the periphery of said plates to said flange.

5. A drive mechanism for a rotating and traversing vertical blind including an other than circular rod comprising: a pair of plates, a protuberance on one of said plates having a bore therethrough receiving a rod, a bore in said other plate receiving said protuberance, a flange on said second mentioned plate surrounding said protuberance, the periphery of said plates being formed to receive a chain, and pin guide means from said periphery to said flange, and a pin insertable into said guide means.

6. A drive mechanism for a rotating and traversing vertical blind including an other than circular rod comprising: a pair of plates, a protuberance on one of said plates having a bore therethrough receiving a rod, a bore in said other plate receiving said protuberance, a flange on said second mentioned plate surrounding said protuberance, means keying said protuberance to said flange, the periphery of said plates being formed to receive a chain, pin guide means from said periphery to said flange, and a pin insertable in said guide means.

References Cited in the file of this patent

UNITED STATES PATENTS

| | | |
|---|---|---|
| 237,910 | Ryno | Feb. 15, 1881 |
| 1,045,712 | Lewis | Nov. 26, 1912 |
| 1,076,605 | Reston | Oct. 21, 1913 |
| 1,654,399 | Andrews | Dec. 8, 1925 |
| 2,577,046 | Svirsky | Dec. 4, 1951 |